Patented Sept. 10, 1940

2,214,363

UNITED STATES PATENT OFFICE 2,214,363

METHOD OF REMOVING PARAFFIN WAX FROM WELLS

Martin de Simo, Piedmont, Howard C. Lawton and Albert G. Loomis, Berkeley, Calif., assignors to Shell Development Company, San Francisco, Calif., a corporation of Delaware No Drawing. Application April 3, 1939, Serial No. 265,762

7 Claims. (Cl. 166—21)

This invention pertains to the art of removing clogging deposits of paraffinic, asphaltic, waxy, and similar high-melting deposits of organic nature from formations traversed by oil wells, and from the tubing, casing and other equipment in said wells, by means of an exothermic process wherein the heat of polymerization of unsaturated organic compounds is utilized to melt these deposits, thereby permitting their removal.

Many processes have already been proposed to melt and remove obstructing paraffin wax deposits from oil wells by the heat generating interaction of such agents as, for example, a strong acid and a caustic alkali, or a comminuted metal, and oxidizing compound and a caustic alkali. A common disadvantage of such processes is that the chemicals are introduced in aqueous solution, whereby the melted paraffin must be removed while hot or is precipitated again on cooling. Further, these processes often fail to generate sufficient heat to clean the well.

It is, therefore, an object of this invention to provide a method for treating clogged oil wells by means of reagents capable of developing an amount of heat sufficient for melting and/or dissolving and removing the obstructing deposits of paraffinous, asphaltic or waxy nature.

It is another object of this invention to provide for the above treatment suitable fluid reagents capable of dissolving paraffin at temperatures near its melting point, and of holding it in suspension even on cooling of the treating fluid.

It is a further object of this invention to provide for said treatment a heat generating process carried out in the presence of a solvent capable of dissolving paraffin wax and reaction products of the treatment.

The process of the present invention consists broadly in generating heat within a well by means of an exothermic reaction involving polymerization of unsaturated organic compounds, the polymerization of which is catalyzed by a suitable catalyst. Solvents may be used with the present process to aid in the removal of paraffinous deposits.

Unsaturated organic substances which may be used for the process of the present invention may be olefines, diolefines, tertiary olefines, etc. Tertiary olefines and particularly those with a terminal double bond attached to the tertiary carbon atom, are preferable. It is obvious that substances which yield solid polymerization products under the conditions of the treatment would be unsuitable for the purpose of this invention. Hence, isoprene, which yields a rubber-like resin, would not be applicable, but compounds which yield more or less viscous liquid polymers such as for example, isobutylene, isoamylene, and higher homologues, and members of the family of terpene hydrocarbons, as for example pinene, may be used successfully in the present process.

As solvents suitable for use within the present process, the following may be used: carbon tetrachloride, benzene, kerosene, kerosene extract, tetralin, iso-octane, ketones, such as methyl ethyl ketone, chlorinated organic compounds, etc. It is preferable to use a solvent whose boiling point is above the melting point of the wax in order to avoid heating losses due to the vaporization of the solvent.

As suitable catalysts for the present process, Friedel-Crafts type catalysts, preferably those which are soluble in organic solvents, such as $BF_3$, $BBr_3$, $BCl_3$, $PF_3$, $PCl_3$, $PF_5$, $PCl_5$, $AlCl_3$, etc., as well as catalysts such as floridin and $H_2SO_4$, may be used. Gaseous boron fluoride is preferable because it polymerizes unsaturated compounds at normal well temperatures with a maximum amount of evolved heat and can be readily separated from the liquid produced from the well.

In general, it is preferable that polymerization of unsaturated hydrocarbons by boron fluoride be carried out under substantially anhydrous conditions, as the presence of water causes hydrolysis of the boron fluoride to hydrofluoric and boric acids. However, under completely anhydrous conditions a very small amount of moisture or halogen acid should be added to promote the catalytic action. The amount of moisture permissible in the mixture to be polymerized is less than required to decompose all of the catalyst boron fluoride and preferably less than 5 per cent by weight of the catalyst. In wells other than those which do not produce water, water may be excluded by any of the well known water shut-off methods, either chemical or mechanical, preparatory to treatment by the process of the present invention. Such shut-off, however, is usually unnecessary, unless the rate of production of water is such that the production horizon is covered by water in the well before the method can be applied after bailing the well dry.

In treating a well by the process of this present invention the following procedure may be followed:

A sample of the paraffin wax deposit is obtained from the well, and subjected to tests to determine its melting point and the type of solvent especially effective in dissolving it at temperatures near the melting point. The melting points of paraffin wax usually fall within a temperature range of from 50° to 95° C.

The well is then pumped or bailed until free of liquid. In water-producing wells, the water is first excluded by means of packers set to seal off the water producing strata or by any other means known to the art, such as a chemical treatment. Then the solvents and heat generating agents are introduced in any desired manner. For example, a preferred method consists in pumping down the well a solvent containing an unsaturated compound such as turpentine. The gaseous catalyst boron fluoride, is then passed into this liquid by any suitable means, such as a bailer with control valves, or suitable tubing. Another method may comprise lowering into the well a solvent such as iso-octane and then by means of suitable containers first passing gaseous unsaturated compounds through the solvent, and then boron fluoride. A mixture of unsaturated compounds may be used, as well. The amount of reagent used in the preferred method is calculated so as to raise the fluid level above the top of the formation, and so as to generate an amount of heat in excess by at least 50% of that necessary to melt the wax, whereby the effect of heat losses due to conduction into the formation is neutralized. It is preferable to introduce the catalyst into the unsaturated compound as long as a rapid rise in temperature takes place; for example, on the basis of the unsaturate up to 5 per cent by weight of the gaseous catalyst may be employed.

The hot solution is allowed to remain in the well for a sufficiently long time to insure that all paraffin wax has been dislodged, melted, or sufficiently heated to form a slurry with or dissolved by the solvent, and is then removed by bailing, swabbing, or pumping.

A marked advantage over an aqueous solution of chemicals to furnish heat and remove wax is that the organic solvent will dissolve or dislodge the melted wax, and can be removed from the well by bailing. The solution should be removed before the temperature reaches the point where wax is solidified again. The added solvent lowers the temperature at which solidification occurs, and even though some cooling takes place, the wax will remain in suspension, with the result that the wax may be completely removed from the well rather than deposited again on cooling.

The following examples, compiled on the basis of experimental runs, show the temperature rise obtained from given volumes of materials and may be used to calculate the actual quantities of materials necessary to treat wells under any particular set of conditions.

*Example I*

Separate streams of isobutylene and boron fluoride (in ratio of 5% by weight on isobutylene) were bubbled through 100 volumes of iso-octane, containing about 0.36 lb. of absorbed isobutylene per gallon of iso-octane. In 10 minutes the temperature increased from 19.5° C. to 93° C., an increase of 73.5° C.

*Example II*

A stream of isobutylene was introduced into 100 volumes of iso-octane until approximately saturated, whereby the temperature was raised from 22° C. to 42° C. due to heat of absorption. Boron fluoride was then bubbled into the liquid at the same time. After 10 minutes the temperature was 93.5° C., giving a total increase of 71.5° C., and due to the polymer formation the liquid increased to 139 volumes.

*Example III*

Boron fluoride was passed through a mixture of 25 volumes of turpentine and 25 volumes of kerosene for one-half minute, that is, until the mixture was approximately saturated with $BF_3$. The temperature increased from 22.1° C. to 129.0° C. in 20 minutes, giving an increase of 106.9° C.

In Example II the exothermic heat of absorption of isobutylene by iso-octane is utilized in addition to the heat of polymerization.

In all the above cases boron fluoride acts as a catalyst.

Although for the sake of brevity isobutylene and turpentine as polymerizable materials, iso-octane and kerosene as solvents, and boron fluoride as a catalyst have been used to illustrate the application of the process of the present invention to the removal of paraffin wax deposits from oil wells, laboratory and field tests will show that other unsaturated compounds, solvents and catalysts listed hereinbefore may be used successfully in the present process.

We claim as our invention:

1. In the process of cleaning a well from obstructing organic deposits the steps of introducing into the well a polymerizable unsaturated organic compound which yields liquid polymers, polymerizing said organic compound within the well by means of a halide catalyst of the Friedel-Crafts type, melting the deposits by the heat generated by the polymerization reaction, and removing the melted deposits from the well.

2. In the process of cleaning a well from obstructing organic deposits the steps of introducing into the well a solvent and a polymerizable unsaturated organic compound which yields liquid polymers, polymerizing said unsaturated organic compound within the well by means of a halide catalyst of the Friedel-Crafts type, melting the deposits by the heat generated by the polymerization reaction, dissolving the melted deposits in the solvent, and removing the resultant mixture from the well.

3. In the process of cleaning a well for obstructing organic deposits the steps of polymerizing unsaturated organic compounds yielding liquid polymers within the well by means of a gaseous halide catalyst of the Friedel-Crafts type and causing the heat generated by the polymerization reaction to melt said deposits.

4. In the porcess of cleaning of well from obstructing organic deposits the steps of polymerizing tertiary olefines which yield liquid polymers within the well by means of a halide catalyst of the Friedel-Crafts type and causing the heat generated by the polymerization reaction to melt said deposits.

5. In the process of cleaning a well from obstructing organic deposits the steps of polymerizing tertiary olefines which yield liquid polymers within the well by means of boron fluoride and causing the heat generated by the polymerization reaction to melt said deposits.

6. In the process of cleaning a well from obstructing organic deposits the steps of polymerizing tertiary olefines which yield liquid polymers within the well by means of boron fluoride, said olefines being of the type containing a terminal double bond attached to the tertiary carbon atom, and causing the heat generated by the polymerization reaction to melt said deposits.

7. In the process of cleaning a well from obstructing organic deposits, the steps of introducing into the well a solvent and tertiary olefines which yield liquid polymers, said olefines being of the type containing a terminal double bond attached to a tertiary carbon atom, polymerizing said olefines within the well by means of boron fluoride, causing heat to be generated within the well to melt said deposits, dissolving the melted deposits in the solvent, and removing the resultant mixture from the well.

MARTIN DE SIMO.
HOWARD C. LAWTON.
ALBERT G. LOOMIS.